(12) United States Patent
Imanilov et al.

(10) Patent No.: US 12,328,669 B2
(45) Date of Patent: Jun. 10, 2025

(54) AUTONOMOUS POWER SAVING IN A REMOTE UNIT IN A WIRELESS COMMUNICATIONS SYSTEM (WCS)

(71) Applicant: Corning Research & Development Corporation, Corning, NY (US)

(72) Inventors: Benjamin Imanilov, Hod haSharon (IL); Shlomi Kulik, Elkana (IL); Gavriel Mizrahi, Tel Aviv (IL)

(73) Assignee: ANI Acquisition Sub, LLC, Boca Raton, FL (US)

( * ) Notice: Subject to any disclaimer, the term of this patent is extended or adjusted under 35 U.S.C. 154(b) by 372 days.

(21) Appl. No.: 17/886,668

(22) Filed: Aug. 12, 2022

(65) Prior Publication Data
US 2023/0056739 A1    Feb. 23, 2023

Related U.S. Application Data

(60) Provisional application No. 63/235,373, filed on Aug. 20, 2021.

(51) Int. Cl.
*H04W 52/02* (2009.01)
*H04W 76/28* (2018.01)

(52) U.S. Cl.
CPC ....... *H04W 52/0206* (2013.01); *H04W 76/28* (2018.02)

(58) Field of Classification Search
CPC ... H04W 52/0206; H04W 76/28; Y02D 30/70
See application file for complete search history.

(56) References Cited

U.S. PATENT DOCUMENTS

| | | | | |
|---|---|---|---|---|
| 2008/0261663 A1* | 10/2008 | Park | ........... | H04W 52/0229 |
| | | | | 455/574 |
| 2010/0304794 A1* | 12/2010 | Beninghaus | ...... | H04W 52/0274 |
| | | | | 455/574 |
| 2012/0264416 A1* | 10/2012 | Pica | ........... | H04W 76/27 |
| | | | | 455/422.1 |
| 2021/0409119 A1* | 12/2021 | Stapleton | ........ | H04B 10/25753 |
| 2022/0007456 A1* | 1/2022 | Bao | ........... | H04W 76/27 |

* cited by examiner

*Primary Examiner* — Chae S Lee
(74) *Attorney, Agent, or Firm* — Greenberg Traurig, LLP; Mammen ("Roy") P. Zachariah

(57) ABSTRACT

Autonomous power saving in a remote unit in a wireless communications system (WCS) is provided. The remote unit can be part of a distributed communications system (DCS) in the WCS, wherein the remote unit communicates downlink and uplink communications signals over a set of radio resources based on a non-cooperative connectivity to a signal source. Herein, the remote unit is configured to opportunistically engage in a power saving mode operation without requiring control signaling and/or a real time trigger from the signal source. More specifically, the remote unit is configured to determine an inactivity period(s) in the set of radio resources that is suited for the power saving mode operation and autonomously enter the power saving mode operation during the determined inactivity period(s). By autonomously engaging in the power saving mode operation, it is possible to reduce power consumption in the remote unit and overall operating expense of the WCS.

20 Claims, 14 Drawing Sheets

500

```
┌─────────────────────────────────────────────────────────────┐
│ DETERMINE AT LEAST ONE INACTIVITY PERIOD (420) IN A SET OF RADIO │
│   RESOURCES THAT IS SUITED FOR A POWER SAVING MODE OPERATION    │
│                             502                                 │
└─────────────────────────────────────────────────────────────┘
                              │
                              ▼
┌─────────────────────────────────────────────────────────────┐
│ DEFINE A PLURALITY OF POWER SAVING INTERVALS (422(1)-422(M)) BASED ON │
│       THE DETERMINED AT LEAST ONE INACTIVITY PERIOD (420)       │
│                             504                                 │
└─────────────────────────────────────────────────────────────┘
                              │
                              ▼
┌─────────────────────────────────────────────────────────────┐
│  OPERATE IN THE POWER SAVING MODE OPERATION IN EACH OF THE PLURALITY │
│            OF POWER SAVING INTERVALS (422(1)-422(M))            │
│                             506                                 │
└─────────────────────────────────────────────────────────────┘
```

FIG. 5

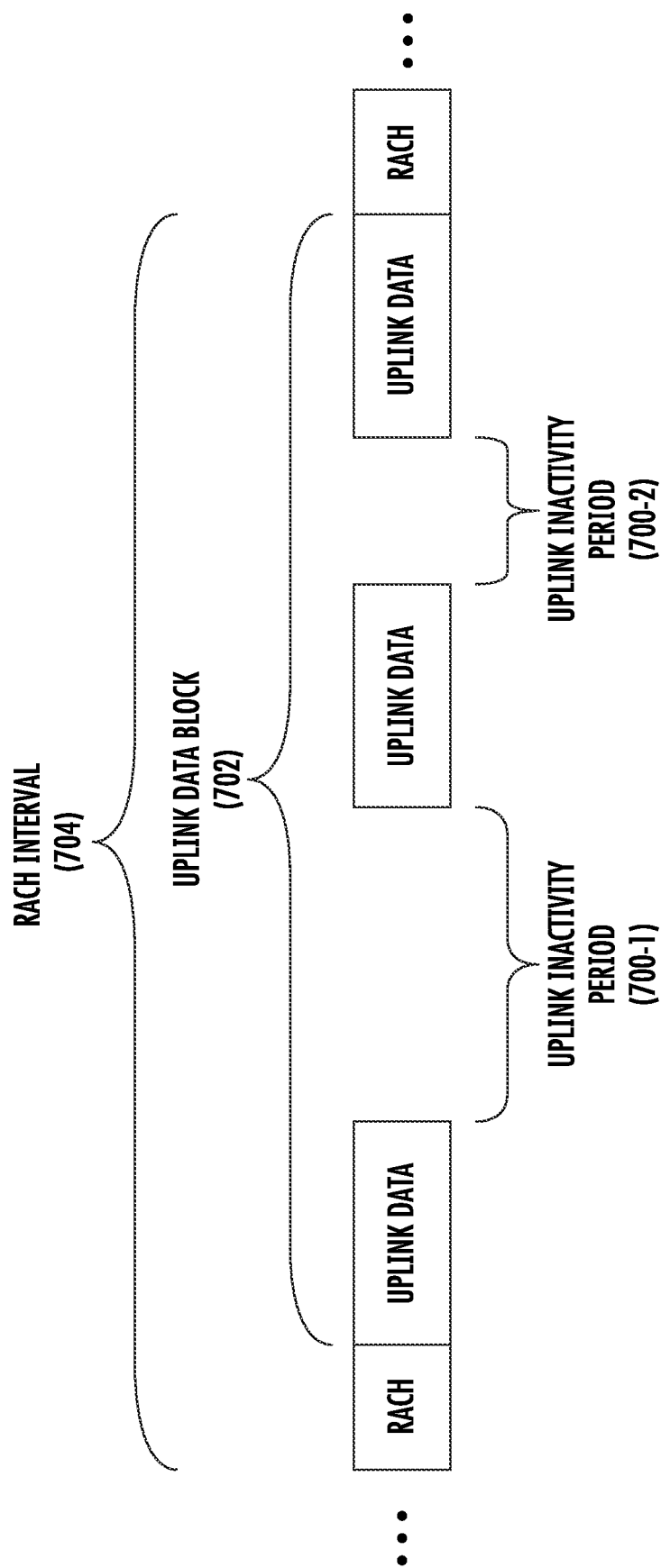

AUTONOMOUS POWER SAVING IN A REMOTE UNIT IN A WIRELESS COMMUNICATIONS SYSTEM (WCS)

CROSS-REFERENCE TO RELATED APPLICATIONS

This application claims the benefit of priority under 35 U.S.C. § 119 of U.S. Provisional Application Ser. No. 63/235,373, filed Aug. 20, 2021, the content of which is relied upon and incorporated herein by reference in its entirety.

BACKGROUND

The disclosure relates generally to power saving in a wireless communications system (WCS), which can include a fifth-generation (5G) or a 5G new-radio (5G-NR) system and/or a distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous RF beams ("beams") 120(1)-120(N) for the communications signal streams 108(1)-108(S) to serve multiple wireless client devices 106(1)-106(W). For example, the multiple RF beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the communications signals 110(1)-110(N) of the multiple service providers 104(1)-104(N) to remote units. The remote units can each include an antenna array that includes tens or even hundreds of antennas for concurrently radiating the communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the communications signals 110(1)-110(N) to subscribers based on a massive multiple-input multiple-output (M-MIMO) scheme.

The WCS 100 may be configured to operate as a fifth generation (5G) or a 5G new-radio (5G-NR) communications system. In this regard, the radio node 102 can function as a 5G or 5G-NR base station (a.k.a. eNodeB) to service the wireless client devices 106(1)-106(W). Notably, the 5G or 5G-NR wireless communications system may be implemented based on a millimeter-wave (mmWave) spectrum that can make the communications signals 110(1)-110(N) more susceptible to propagation loss and/or interference. As such, it is desirable to radiate the RF beams 120(1)-120(N) based on a desirable RF beam pattern to help mitigate signal propagation loss and/or interference in the mmWave spectrum.

Moreover, since the antenna 112 can be an antenna array with multiple antennas, the radio node 102 will need to employ multiple active circuits, such as power management circuits, power amplifiers, low-noise amplifiers (LNAs), RF filters, and switches, to enable concurrent transmission/reception of the multiple antennas. Understandably, these active circuits can consume substantial amount of power during operation. As such, it is also desirable to adopt sound power saving techniques to help reduce power consumption in the radio node 112.

SUMMARY

Embodiments disclosed herein include autonomous power saving in a remote unit in a wireless communications system (WCS). The remote unit can be part of a distributed communications system (DCS) in the WCS, wherein the remote unit communicates downlink and uplink communications signals over a set of radio resources based on a non-cooperative connectivity to a signal source (e.g., base station). In embodiments disclosed herein, the remote unit is configured to opportunistically engage in a power saving mode operation without requiring control signaling and/or a real time trigger from the signal source. More specifically, the remote unit is configured to determine an inactivity period(s) in the set of radio resources that is suited for the power saving mode operation and autonomously enter the power saving mode operation during the determined inactivity period(s). By autonomously engaging in the power saving mode operation, it is possible to reduce power consumption in the remote unit. As a result, it is possible to reduce the overall operating expense of the WCS.

One exemplary embodiment of the disclosure relates to a remote unit. The remote unit includes a radio frequency (RF) front-end circuit. The RF front-end circuit is configured to communicate at least one downlink communications signal and receive at least one uplink communications signal over a set of radio resources. The remote unit also includes a processing circuit. The processing circuit is configured to determine at least one inactivity period in the set of radio resources that is suited for a power saving mode operation. The processing circuit is also configured to define a plurality of power saving intervals based on the determined at least one inactivity period. The processing circuit is also configured to cause the remote unit to operate in the power saving mode operation in each of the plurality of power saving intervals.

An additional exemplary embodiment of the disclosure relates to a method for supporting autonomous power saving. The method includes determining at least one inactivity period in a set of radio resources that is suited for a power saving mode operation. The method also includes defining a plurality of power saving intervals based on the determined at least one inactivity period. The method also includes operating in the power saving mode operation in each of the plurality of power saving intervals.

An additional exemplary embodiment of the disclosure relates to a WCS. The WCS includes a distributed communications system (DCS). The DCS includes a routing unit (RU) coupled to a centralized services node via a baseband unit (BBU). The DCS also includes a plurality of remote units each coupled to the DRU via a plurality of optical fiber-based communications mediums, respectively. The RU is configured to distribute a plurality of downlink communications signals to the plurality of remote units, respectively. The RU is also configured to receive a plurality of uplink communications signals from the plurality of remote units, respectively. At least one of the plurality of remote units includes an RF front-end circuit. The RF front-end circuit is configured to communicate one of the plurality of downlink communications signals and receive a respective one of the plurality of uplink communications signals over a set of radio resources. The at least one of the plurality of remote units also includes a processing circuit. The processing circuit is configured to determine at least one inactivity period in the set of radio resources that is suited for a power saving mode operation. The processing circuit is also configured to define a plurality of power saving intervals based on the determined at least one inactivity period. The processing circuit is also configured to cause the at least one of the plurality of remote units to operate in the power saving mode operation in each of the plurality of power saving intervals.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 5 is a flowchart of an exemplary process that can be employed by the remote unit of FIG. 4 to support autonomous power saving;

FIG. 7A is a schematic diagram providing an exemplary illustration of an uplink inactivity period(s) that may be explored for an uplink power saving mode operation;

DETAILED DESCRIPTION

Embodiments disclosed herein include autonomous power saving in a remote unit in a wireless communications system (WCS). The remote unit can be part of a distributed communications system (DCS) in the WCS, wherein the remote unit communicates downlink and uplink communications signals over a set of radio resources based on a non-cooperative connectivity to a signal source (e.g., base station). In embodiments disclosed herein, the remote unit is configured to opportunistically engage in a power saving mode operation without requiring control signaling and/or a real time trigger from the signal source. More specifically, the remote unit is configured to determine an inactivity period(s) in the set of radio resources that is suited for the power saving mode operation and autonomously enter the power saving mode operation during the determined inactivity period(s). By autonomously engaging in the power saving mode operation, it is possible to reduce power consumption in the remote unit. As a result, it is possible to reduce the overall operating expense of the WCS.

Figure 1:
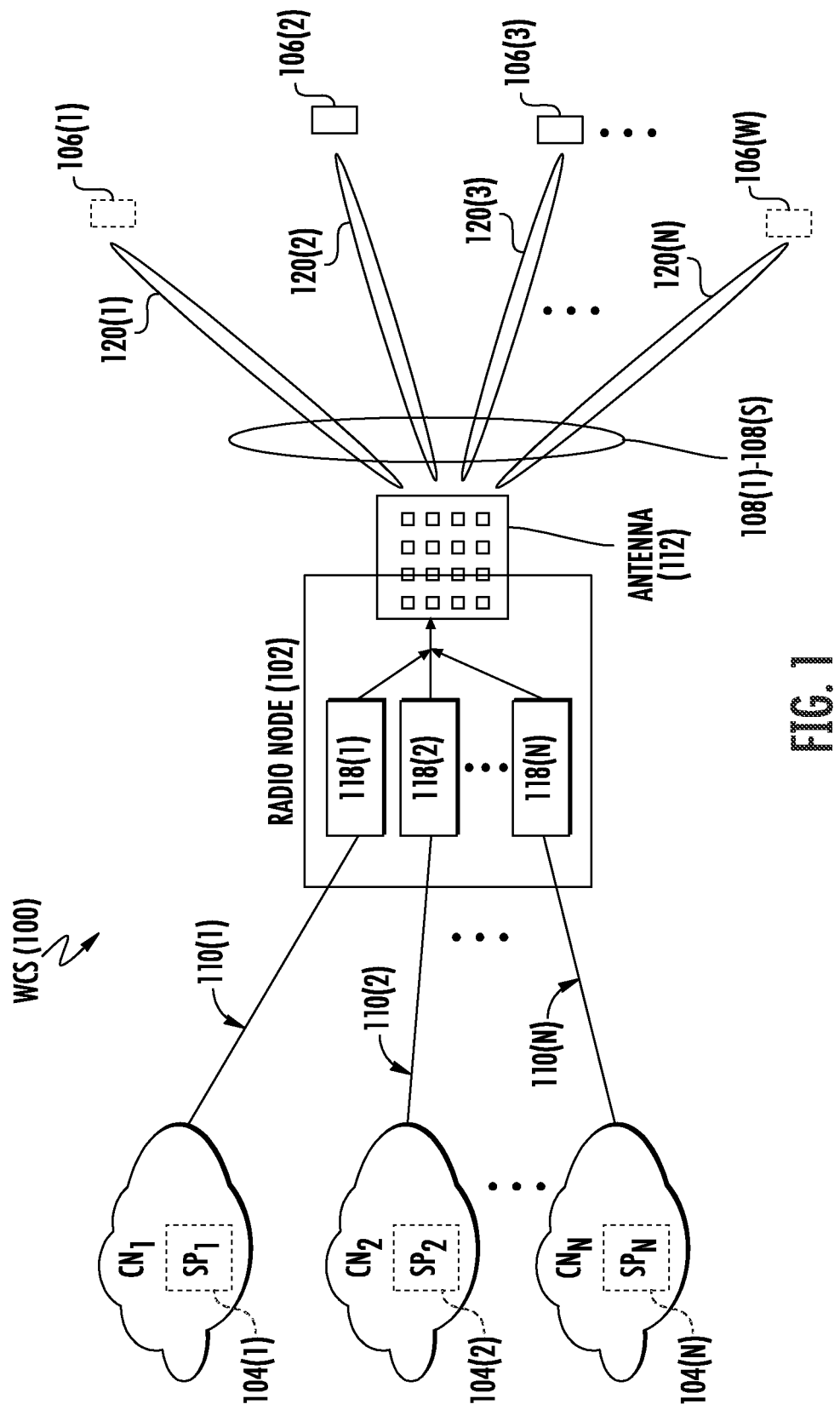
FIG. 1 is a schematic diagram of an exemplary wireless communications system (WCS), such as a distributed communications system (DCS), configured to distribute communications services to remote coverage areas.
Figure 2A:
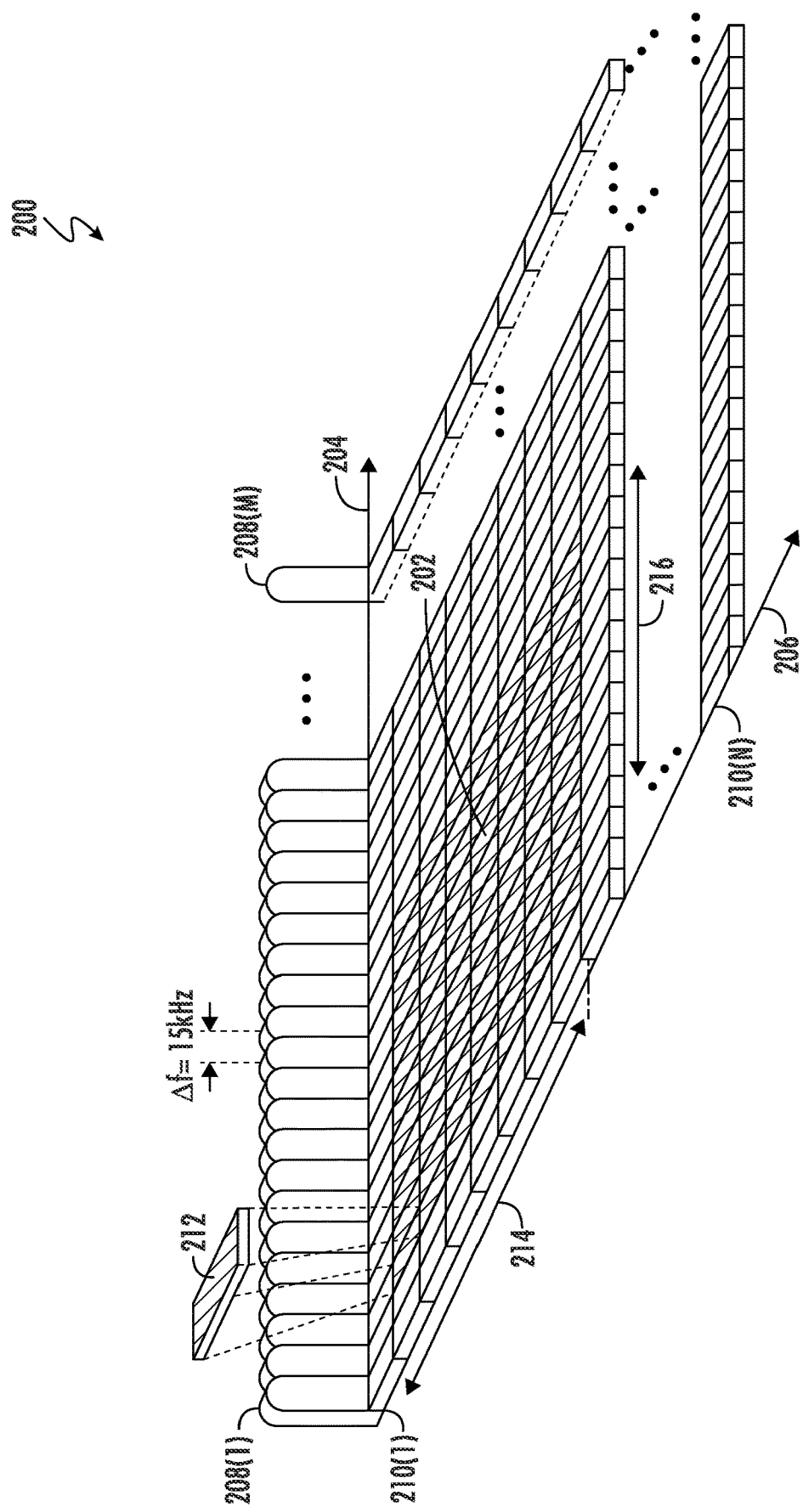
FIG. 2A is a schematic diagram of an exemplary physical resource allocation scheme based on an orthogonal frequency division multiplexing (OFDM) time-frequency grid providing a set of radio resources that can be allocated for downlink and uplink communications based on at least one resource block (RB)
Figure 2C:
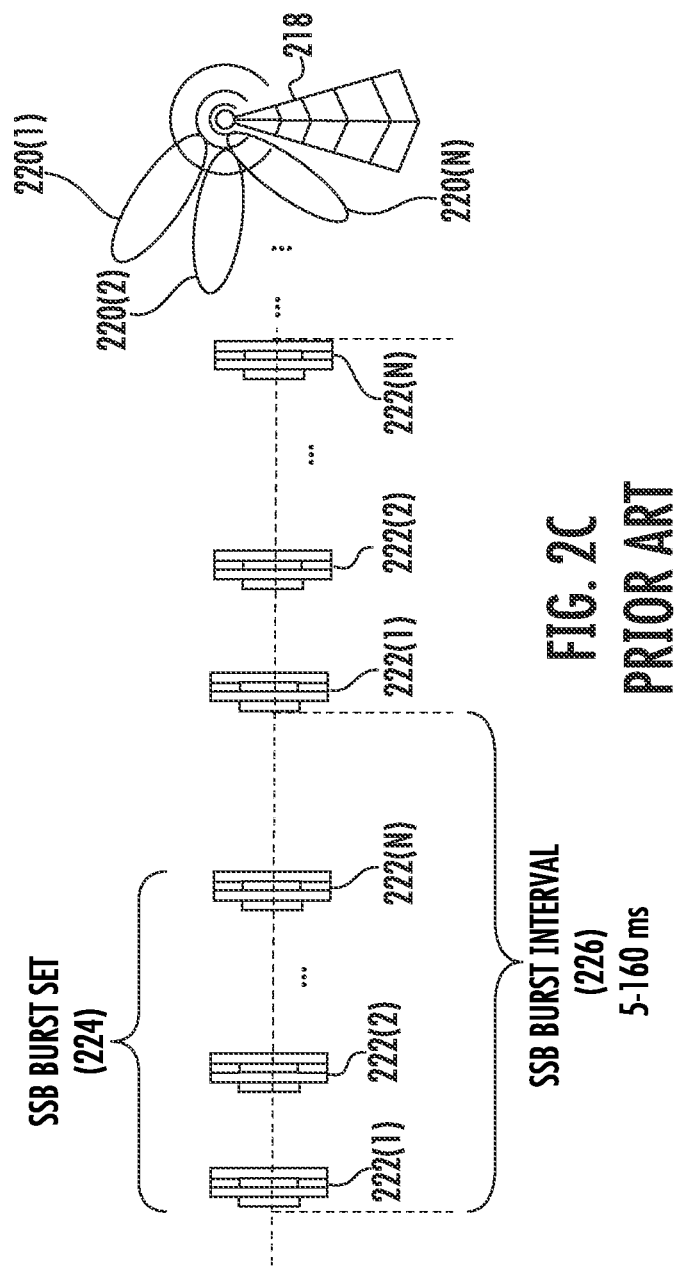
FIGS. 2B-2C are graphic diagrams providing exemplary illustrations of a number of fundamental aspects related to radio frequency (RF) beamforming.
Figure 2B:
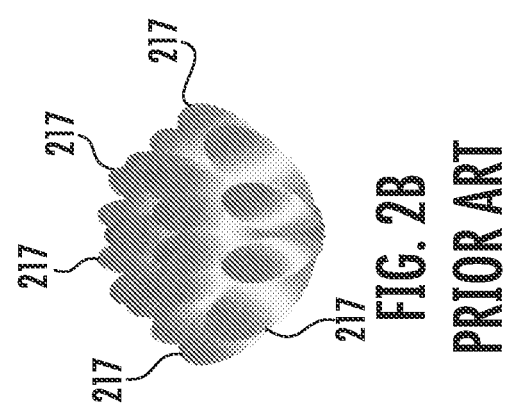
Figure 2D:
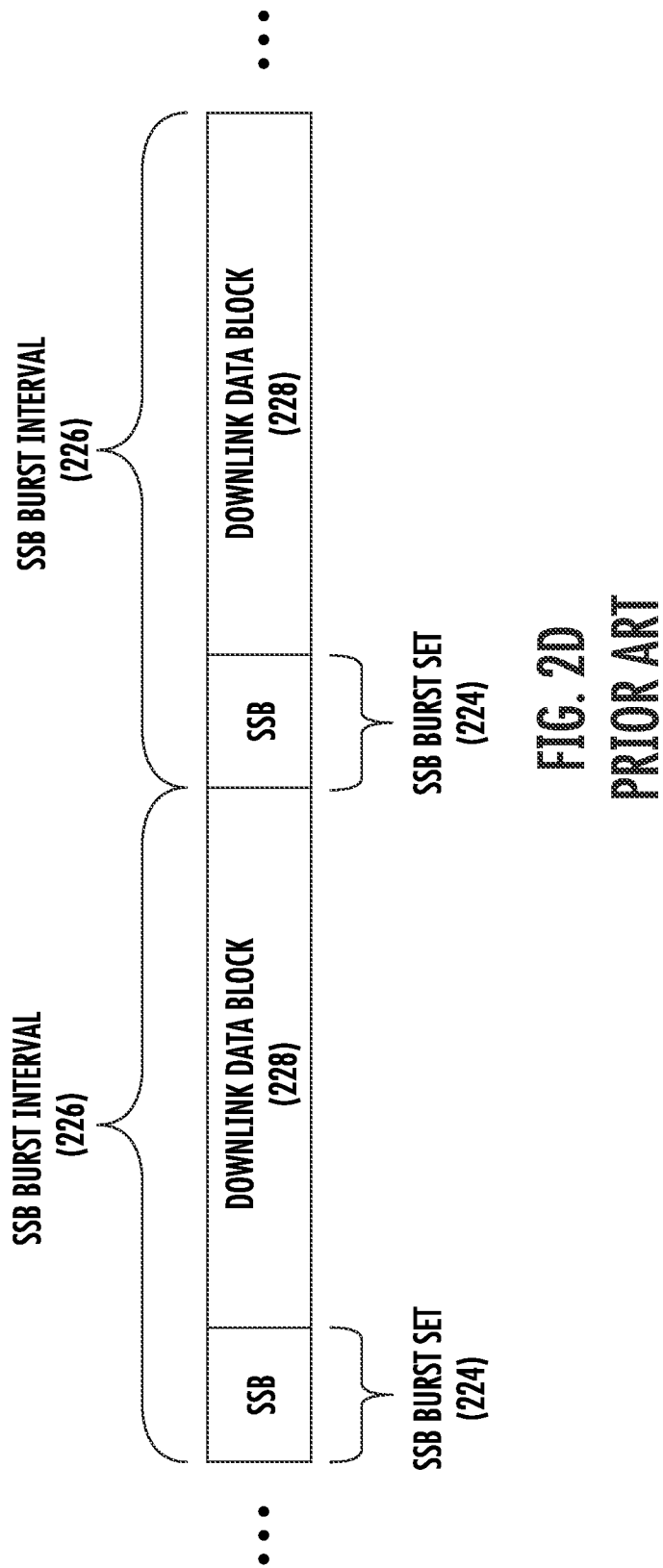
FIG. 2D is a schematic diagram providing an exemplary illustration of a synchronization signal block (SSB) burst set(s) communicated in an SSB burst interval(s)
Figure 3:
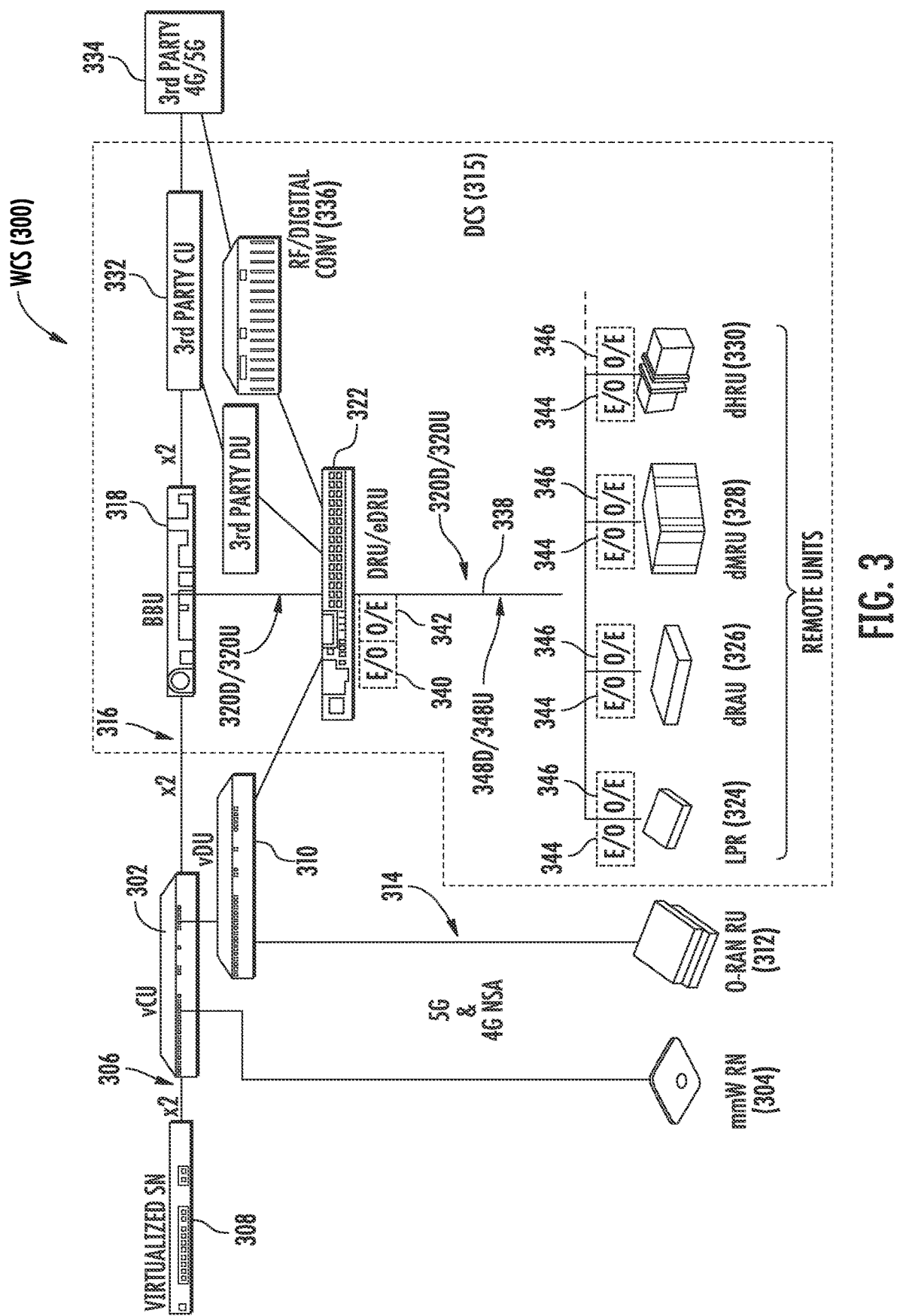
FIG. 3 is a schematic diagram of an exemplary WCS configured according to any of the embodiments disclosed herein to support autonomous power saving in a remote unit(s)

Before discussing a remote unit of the present disclosure configured to reduce power consumption, starting at FIG. 3, a brief overview is first provided with reference to FIGS. 2A-2D to help explain some fundamental aspects related to an orthogonal frequency division multiplexing (OFDM) based wireless communications system, such as the fifth generation (5G) and the 5G new radio (5G-NR) systems.

FIG. 2A is a schematic diagram of an exemplary physical resource allocation scheme based on an OFDM time-frequency grid 200 providing a set of radio resources that can be allocated for downlink and uplink communications based on at least one resource block (RB) 202. The OFDM time-frequency grid 200 includes a frequency-domain axis 204 and a time-domain axis 206. Along the frequency-domain axis 204, there are a plurality of subcarriers 208(1)-208(M). The subcarriers 208(1)-208(M) are orthogonally separated from each other by a frequency spacing Δf (e.g., 15 KHz). Along the time-domain axis 206, there are a plurality of OFDM symbols 210(1)-210(N).

Each intersection of the subcarriers 208(1)-208(M) and the OFDM symbols 210(1)-210(N) defines a resource element (RE) 212. The subcarriers 208(1)-208(M) along the frequency-domain axis 204 and the OFDM symbols 210(1)-210(N) along the time-domain axis 206 collectively define the set of radio resources (a.k.a. "physical radio resource") that can be allocated for downlink and uplink communications.

In one embodiment, the set of radio resources can be allocated for downlink and uplink communications based on a frequency-division duplex (FDD) scheme. In this regard, the subcarriers 208(1)-208(M) are divided into two subsets of separate and non-overlapping subcarriers, each including the OFDM symbols 210(1)-210(N). In this regard, a first subset of the subcarriers 208(1)-208(M) and the OFDM symbols 210(1)-210(N) collectively define a set of downlink radio resources for the downlink communication, while a second subset of the subcarriers 208(1)-208(M) and the OFDM symbols 210(1)-210(N) collectively define a set of uplink radio resources for the uplink communication.

In another embodiment, the set of radio resources can be allocated for downlink and uplink communications based on a time-division duplex (TDD) scheme. In this regard, the set of radio resources formed by the subcarriers 208(1)-208(M) and the OFDM symbols 210(1)-210(N) are shared between downlink and uplink communications based a configured downlink-uplink ratio.

In one non-limiting example, the RB 202 includes twelve (12) consecutive subcarriers among the subcarriers 208(1)-208(M), and fourteen (14) consecutive OFDM symbols among the OFDM symbols 210(1)-210(N). In this regard, the RB 202 includes one hundred sixty-eight (168) of the REs 212 (12 subcarriers×14 OFDM symbols). The RB 202 has an RB duration 214, which equals one-half of a millisecond (0.5 ms), along the time-domain axis 206. The RB duration 214 is commonly referred to as a slot or a time slot. Accordingly, the RB 202 has a bandwidth 216, which equals 180 KHz (15 KHz/subcarrier×12 subcarriers), along the frequency-domain axis 204. In an OFDM based communication system, the RB 202 is the minimum unit for allocating the set of radio resources for downlink and uplink communications.

As mentioned earlier, the 5G and 5G-NR systems may be implemented based on a millimeter-wave (mmWave) spectrum that can be more susceptible to propagation loss and/or interference. As such, RF beamforming is a widely utilized technique in 5G and 5G-NR systems to help mitigate signal propagation loss and/or interference in the mmWave spectrum.

In this regard, FIGS. 2B-2C are graphic diagrams providing exemplary illustrations of fundamental aspects related to RF beamforming. In general, beamforming refers to a technique that uses multiple antennas to simultaneously radiate an RF signal in an RF spectrum, such as the mmWave spectrum. The multiple antennas, also called "antenna elements," are typically organized into an antenna array (e.g., 4×4, 8×8, 16×16, etc.) and separated from each other by at least one-half (½) wavelength. The RF signal is pre-processed based on a beam weight set, which includes multiple beam weights corresponding to the multiple antennas, respectively, to generate multiple weighted RF signals. The multiple weighted RF signals are then coupled to specific antennas in the antenna array for simultaneous radiation in the RF spectrum. As illustrated in FIG. 2B, by pre-processing the RF signal based on multiple beam weight sets, it may be possible to form multiple RF beams 217 pointing to multiple directions radiating from antenna elements in an antenna array, respectively.

Although it may be possible for the antennas in the antenna array to form the multiple RF beams 217 in FIG. 2B in the multiple directions, an actual number of the RF beams 217 is typically limited by a standard-defined parameter known as the synchronization signal block (SSB), which is further discussed next in FIG. 2C. In this regard, FIG. 2C is a graphic diagram providing an exemplary illustration on how the SSB limits the actual number of the RF beams 217 that may be formed by the antennas in the antenna array.

As shown in FIG. 2C, a 5G-NR gNB 218 is configured to radiate a plurality of reference beams 220(1)-220(N) in different directions of a 5G-NR coverage cell. The reference beams 220(1)-220(N) are each associated with a respective one of a plurality of SSBs 222(1)-222(N). Each of the SSBs 222(1)-222(N) may include a primary synchronization signal (PSS), a secondary synchronization signal (SSS), and a 5G-NR physical broadcast channel (PBCH).

In this regard, a 5G-NR UE in the 5G-NR coverage cell can sweep through the reference beams 220(1)-220(N) to identify a candidate reference beam(s) associated with a strongest reference signal received power (RSRP). Further, the 5G-NR UE may decode a candidate SSB(s) associated with the identified candidate reference beam(s) to acquire such information as physical cell identification (PCI) and a PBCH demodulation reference signal (DMRS). Based on the candidate reference beam(s) reported by the 5G-NR UE, the 5G-NR gNB 218 may pinpoint a location of the 5G-NR UE and steer a data-bearing RF beam toward the 5G-NR UE to enable data communication with the 5G-NR UE. The SSBs 222(1)-222(N) may be organized into an SSB burst set 224 to be repeated periodically based on an SSB burst interval 226. The 5G and 5G-NR standards, as presently defined by the third-generation partnership project (3GPP), allow a maximum of 64 SSBs to be scheduled in the SSB burst set 224. Accordingly, the 5G-NR gNB 218 can radiate up to 64 reference beams 220(1)-220(N) in each SSB burst interval 226.

In a 5G or 5G-NR communications system, the SSBs 222(1)-222(N) will be multiplexed with other downlink control information (DCI) and downlink data in the subset of downlink radio resources, as previously discussed in FIG. 2A. In this regard, FIG. 2D is a schematic diagram providing an exemplary illustration of the SSB burst set 224 communicated in each SSB burst interval 226.

As shown in FIG. 2D, the SSB burst set 224 is multiplexed with a downlink data block 228 in each SSB burst interval 226. As defined in relevant 3GPP standards, the SSB burst set 224 can have a duration of 5 milliseconds (5 ms) and the SSB burst interval 226 can repeat every five to one hundred sixty milliseconds (5 to 160 ms). According to the previous discussion in FIG. 2A, the SSB burst set 224 and the downlink data block 228 are each allocated with some of the first subset of the subcarriers 208(1)-208(M) and the OFDM symbols 210(1)-210(N) in each SSB burst interval 226.

Notably, the subcarriers 208(1)-208(M) and the OFDM symbols 210(1)-210(N) allocated for communicating the downlink data block 228 will be shared by all users served by the 5G-NR gNB 218 of FIG. 2C. In some cases (e.g., with low user density), however, some OFDM symbols 210(1)-210(N) allocated for the downlink data block 228 may not actually carry any data payload. As such, a duration of those non-data bearing OFDM symbols in any of the SSB burst intervals 226, which is referred to an inactivity period hereinafter, can be explored for power saving.

In this regard, FIG. 3 is a schematic diagram of an exemplary WCS 300 configured according to any of the embodiments disclosed herein to support autonomous power saving in a remote unit(s). The WCS 300 supports both legacy 4G LTE, 4G/5G non-standalone (NSA), and 5G standalone communications systems. As shown in FIG. 3, a centralized services node 302 is provided that is configured to interface with a core network to exchange communications data and distribute the communications data as radio signals to remote units. In this example, the centralized services node 302 is configured to support distributed communications services to an mmWave radio node 304. Despite that only one of the mmWave radio node 304 is shown in FIG. 3, it should be appreciated that the WCS 300 can be configured to include additional numbers of the mmWave radio node 304, as needed. The functions of the centralized services node 302 can be virtualized through an ×2 interface 306 to another services node 308. The centralized services node 302 can also include one or more internal radio nodes that are configured to be interfaced with a distribution unit (DU) 310 to distribute communications signals to one or more open radio access network (O-RAN) remote units (RUs) 312 that are configured to be communicatively coupled through an O-RAN interface 314. The O-RAN RUs 312 are each configured to communicate downlink and uplink communications signals in a respective coverage cell.

The centralized services node 302 can also be interfaced with a distributed communications system (DCS) 315 through an ×2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

In an embodiment, the services node 308 can serve a signal source that generates the downlink communications signals 320D and receives the uplink communications signals 320U. The LPR 324, the dRAU 326, the dMRU 328, and the dHRU 330, which can be collectively referred to as remote unit hereafter, are each coupled to the services node 308 based on non-cooperative connectivity. Herein, non-cooperative connectivity means that the LPR 324, the dRAU 326, the dMRU 328, and the dHRU 330 are not time-synchronized with the services node 308 and do not receive any control signaling and/or real time trigger from the services node 308. In this regard, the LPR 324, the dRAU 326, the dMRU 328, and the dHRU 330 can each be configured to support autonomous power saving based on embodiments disclosed herein.

Figure 4:
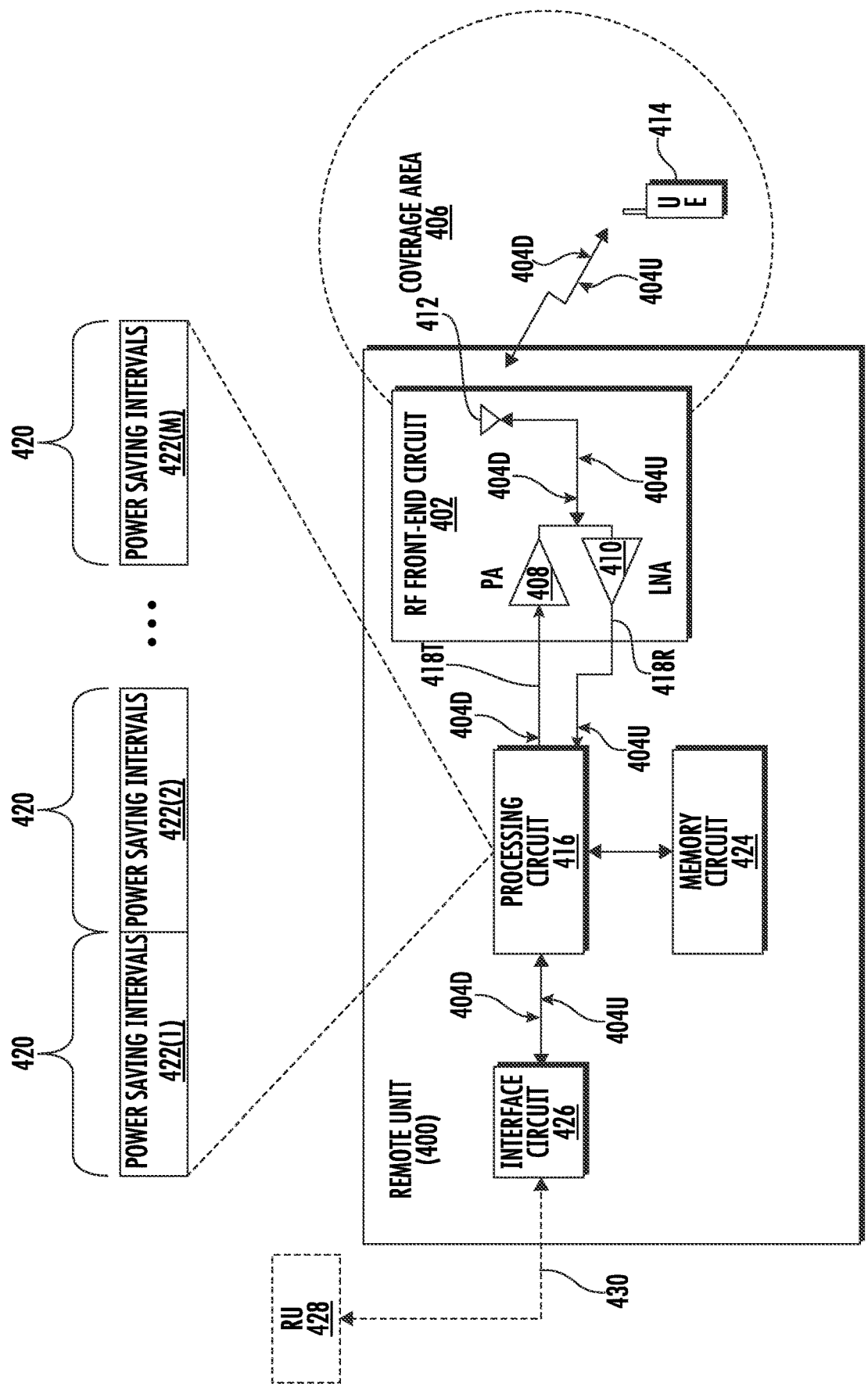
FIG. 4 is a schematic diagram of a remote unit, which can be provided in the WCS of FIG. 3, configured according to embodiments of the present disclosure to support autonomous power saving.

In this regard, FIG. 4 is a schematic diagram of a remote unit 400, which can be any of the LPR 324, the dRAU 326, the dMRU 328, and the dHRU 330 in the WCS 300 of FIG. 3, configured according to embodiments of the present disclosure to support autonomous power saving. The remote unit 400 includes an RF front-end circuit 402. The RF front-end circuit 402 is configured to communicate at least one downlink communications signal 404D and receive at least one uplink communications signal 404U in a coverage area 406. In a non-limiting example, the RF front-end circuit 402 includes at least one power amplifier (PA) 408, at least one low-noise amplifier (LNA) 410, and at least one antenna 412. The antenna 412 is configured to radiate the downlink communications signal 404D (e.g., via RF beamforming) to at least one wireless device 414 in the coverage area 406. The antenna 412 is also configured to receive the uplink communications signal 404U from the wireless device 414. The PA 408 is configured to amplify the downlink communications signal 404D and provide the downlink communications signal 404D to the antenna 412. The LNA 410 is configured to amplify the uplink communications signal 404U received by the antenna 412. Notably, the RF front-end circuit 402 often includes additional active/passive circuits, such as frequency up/down converters, power management circuits, RF filters, and RF switches, and so on. Understandably, the PA 408, the LNA 410, the antenna 412, and the additional active/passive circuits will each consume a certain level of energy during operation. Thus, it is necessary to opportunistically turn off at least some of these circuits to help reduce energy consumption at the remote unit 400.

The remote unit 400 is configured to communicate the downlink communications signal 404D and receive the uplink communications signal 404U over a set of radio resources, which is collectively defined by the subcarriers 208(1)-208(M) and the OFDM symbols 210(1)-210(N) in FIG. 2A. Notably, there may exist an inactivity period(s) in the set of radio resources as some of the OFDM symbols 210(1)-210(N) may not carry any data payload. As a result, it may be possible to explore the inactivity period(s) to provide power saving opportunities.

In this regard, the remote unit 400 is configured to include a processing circuit 416, which can be a field-programmable gate array (FPGA) or an application-specific integrated circuit (ASIC), as an example. The processing circuit 416 is coupled to the PA 408 in a transmit path 418T and the LNA 410 in a receive path 418R. The processing circuit 416 is configured to determine at least one inactivity period 420 in the set of radio resources that is suited for a power saving mode operation. Subsequently, the processing circuit 416 can defined a plurality of power saving intervals 422(1)-422(M) each including the determined inactivity period 420. Accordingly, the processing circuit can cause the remote unit 400 to operate in the power saving mode operation in each of the power saving intervals 422(1)-422(M). In a non-limiting example, during the power saving mode operation, the processing circuit 416 can cause the RF front-end circuit 402 to power off at least some of the circuits (e.g., the PA 408, the LNA 410, and/or the antenna 412) in each of the power saving intervals 422(1)-422(M) to reduce power consumption of the remote unit 400. By detecting the inactivity period 420 to thereby define the power saving intervals 422(1)-422(M), it is possible to reduce power consumption at the remote unit 400 based on non-cooperative connectivity.

The remote unit 400 can be configured to support autonomous power saving based on a process. In this regard, FIG. 5 is a flowchart of an exemplary process 500 that can be employed by the remote unit 400 of FIG. 4 to support autonomous power saving.

According to the process 500, the remote unit 400 is configured to determine the inactivity period 420 in the set of radio resources that is suited for the power saving mode operation (block 502). The remote unit 400 then defines the power saving intervals 422(1)-422(M) based on the determined inactivity period 420 (block 504). Accordingly, the remote unit 400 can operate in the power saving mode operation in each of the power saving intervals 422(1)-422(M) (block 506).

With reference back to FIG. 4, as previously discussed in FIG. 2D, the inactivity period 420 refers to the duration of the OFDM symbols 210(1)-210(N) that are allocated for the downlink data block 228 but do not actually carry any data payload. Although the inactivity period can create opportunities for power saving, not every inactivity period is suited for the power saving mode operation. As such, the processing circuit 416 needs to further determine whether the inactivity period 420 is suited for the power saving mode operation. If the processing circuit 416 determines that the inactivity period 420 is suited for the power saving mode operation, the processing circuit 416 will then define the power saving intervals 422(1)-422(M) based on the determined inactivity period 420 and cause the remote unit 400 to operate in the power saving mode operation during each of the power saving intervals 422(1)-422(M). Otherwise, the processing circuit 416 will cause the remote unit 400 to operate in an active mode operation without power saving.

In a non-limiting example, the remote unit 400 can be configured to communicate the downlink communications signal 404D and receive the uplink communications signal 404U based on the FDD scheme. In this regard, according to the previous discussion in FIG. 2A, the remote unit 400 will communicate the downlink communications signal 404D over the set of downlink radio resources and receive the uplink communications signal 404U over the set of uplink radio resources. Since the set of downlink radio resources and the set of uplink radio resources exist concurrently and do not overlap, it is thus possible for the processing circuit 416 to explore the inactivity period 420 in the set of downlink radio resources and the set of uplink radio resources for downlink and uplink power saving opportunities, respectively. Although the discussion below is based on the FDD scheme, it should be appreciated that the method and process disclosed herein may be applicable to the TDD scheme as well.

Figure 6A:
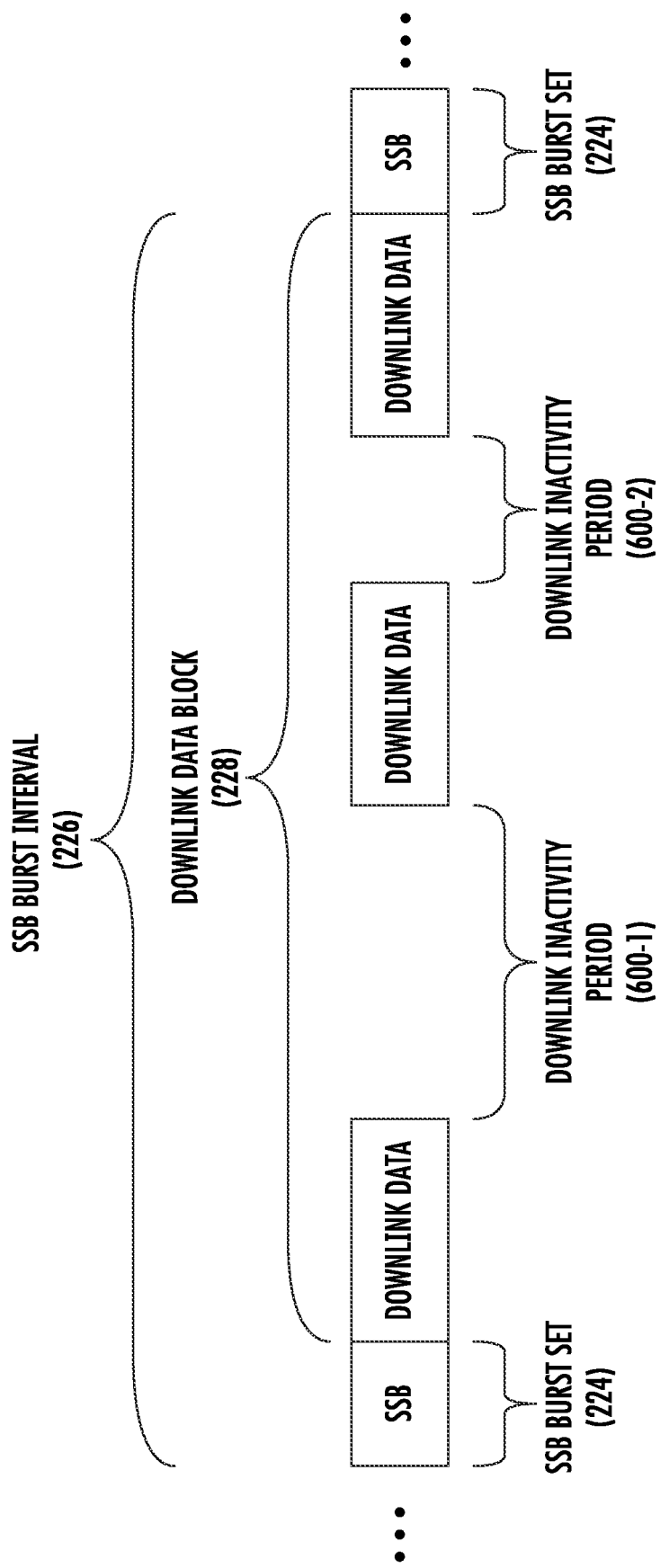
FIG. 6A is a schematic diagram providing an exemplary illustration of a downlink inactivity period(s) that may be explored for a downlink power saving mode operation.

FIG. 6A is a schematic diagram providing an exemplary illustration of a pair of downlink inactivity periods 600-1 and 600-2 that may be explored for the downlink power saving mode operation. Common elements between FIGS. 2D and 6A are shown therein with common element numbers and will not be re-described herein. Notably, the downlink inactivity periods 600-1 and 600-2 are merely non-limiting examples and should not be considered as being limiting by any means.

Figure 6B:
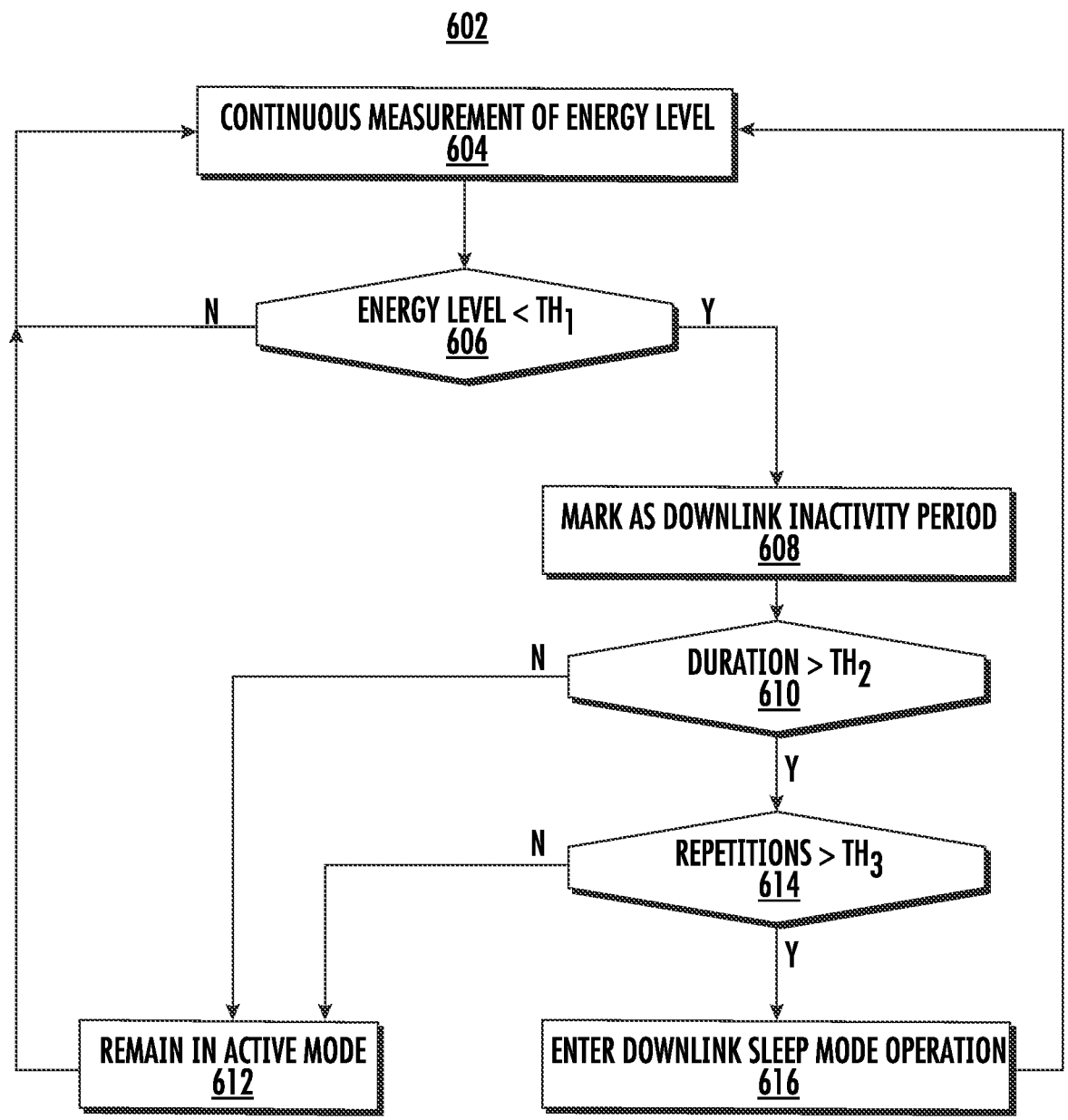
FIG. 6B is a flowchart of an exemplary process that can be employed by the remote unit of FIG. 4 to determine whether the downlink inactivity period(s) in FIG. 6A is suited for a downlink power saving mode operation.

The processing circuit 416 may perform an evaluation process 602 to determine whether any of the downlink inactivity periods 600-1 and 600-2 is suited for the downlink power saving operation. In this regard, FIG. 6B is a flowchart of an exemplary evaluation process 602 that can be employed by the processing circuit 416 in the remote unit 400 of FIG. 4 to determine whether any of the downlink inactivity periods 600-1 and 600-2 in FIG. 6A is suited for the downlink power saving mode operation.

The processing circuit 416 is configured to detect the downlink inactivity periods 600-1 and 600-2 by continuously measuring a downlink energy level of the set of downlink radio resources (block 604). The processing circuit 416 then checks the measured downlink energy level against a first threshold $TH_1$ (block 606). If the measured downlink energy level is above the first threshold $TH_1$, the processing circuit 416 will continue measuring the energy level of the set of downlink radio resources (block 604). If the measured downlink energy level is below the first threshold $TH_1$, the processing circuit 416 can then conclude that one or more of the downlink inactivity periods 600-1 and 600-2 has been detected (block 608).

The processing circuit 416 will then check whether any of the detected downlink inactivity periods 600-1 and 600-2 lasts for a duration longer than a second threshold $TH_2$ (block 610). If none of the detected downlink inactivity periods 600-1 and 600-2 lasts for the duration longer than a second threshold $TH_2$, the processing circuit 416 will cause the remote unit 400 to operate in the active mode operation (block 612) and continuously measure the downlink energy level of the set of downlink radio resources (block 604). If any of the detected downlink inactivity periods 600-1 and 600-2 lasts for the duration longer than the second threshold $TH_2$, the processing circuit 416 will further determine whether the detected downlink inactivity period is repeated for a defined number of times ($TH_3$) over a defined downlink repetition period (block 614). In a non-limiting example, the defined downlink repetition period can be so determined to span across multiple SSB burst intervals 226. If none of the detected downlink inactivity period is repeated for the defined number of times ($TH_3$) over the defined downlink repetition period, the processing circuit 416 will cause the remote unit 400 to operate in the active mode operation (block 612) and will continuously measure the downlink energy level of the set of downlink radio resources (block 604). Otherwise, the processing circuit 416 can conclude that at least one of the detected downlink inactivity periods 600-1 and 600-2 is suited for the downlink power saving mode operation and will cause the remote unit 400 to enter the downlink power saving mode operation (block 616). Notably, the processing circuit 416 will continuously measure the downlink energy level of the set of downlink radio resources (block 604) during the downlink power saving mode operation. Should the measured downlink energy level become higher than the first threshold $TH_1$ during any of the downlink inactivity period 600-1 and 600-2 based on whether the downlink power saving mode operation is performed, the processing circuit 416 may abort the downlink power saving mode operation and repeat the evaluation process 602 to detect a next downlink power saving opportunity.

Through the evaluation process 602, the processing circuit 416 may determine that both the detected downlink inactivity periods 600-1 and 600-2 are suited for the downlink power saving operation. In this regard, in one embodiment, the processing circuit 416 may rank the detected downlink inactivity periods 600-1 and 600-2 based on a set of predetermined ranking criteria. Accordingly, the processing circuit 416 can cause the remote unit 400 to operate in the downlink power saving mode operation based on a highest ranked downlink inactivity period among the detected downlink inactivity periods 600-1 and 600-2. Should the processing circuit 416 abort the downlink power saving mode operation for any cause, the processing circuit 416 may redetermine and/or re-rank of the detected downlink inactivity periods 600-1 and 600-2 in accordance with the evaluation process 602.

The processing circuit 416 may further cause the remote unit 400 to operate in an uplink power saving mode operation, concurrent to or independent of the downlink power saving mode operation. In this regard, FIG. 7 is a schematic diagram providing an exemplary illustration of a pair of uplink inactivity periods 700-1 and 700-2 that may be explored for uplink power saving mode operation. Notably, the uplink inactivity periods 700-1 and 700-2 are merely non-limiting examples and should not be considered as being limiting by any means.

Figure 7B:
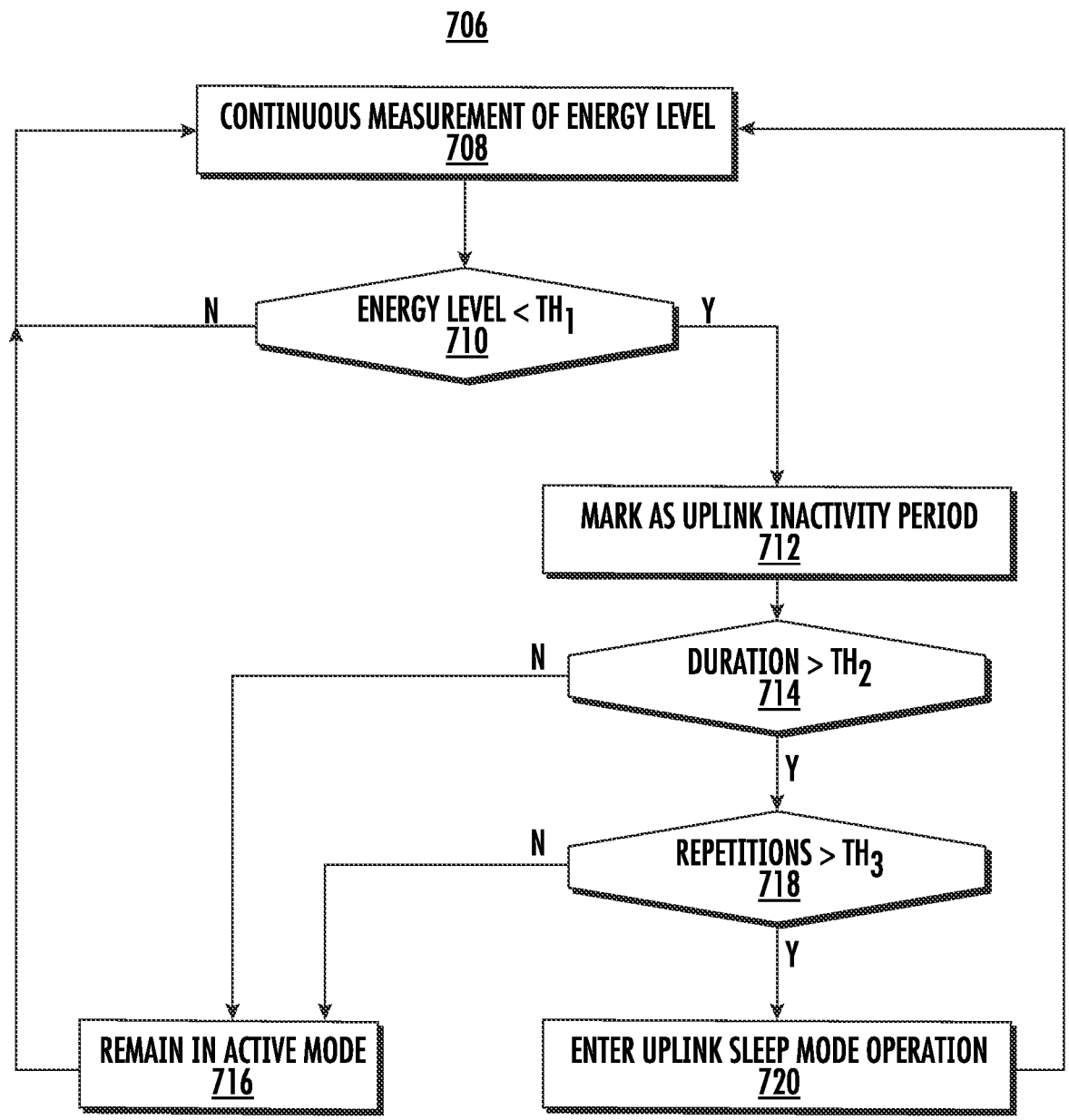
FIG. 7B is a flowchart of an exemplary process that can be employed by the remote unit of FIG. 4 to determine whether the uplink inactivity period(s) in FIG. 7A is suited for an uplink power saving mode operation.

As shown in FIG. 7A, the uplink inactivity periods 700-1 and 700-2 may exist in an uplink data block 702 during a RACH interval 704. The processing circuit 416 may perform an evaluation process 706 to determine whether any of the uplink inactivity periods 700-1 and 700-2 is suited for the uplink power saving operation. In this regard, FIG. 7B is a flowchart of an exemplary evaluation process 702 that can be employed by the processing circuit 416 in the remote unit 400 of FIG. 4 to determine whether any of the uplink inactivity periods 700-1 and 700-2 in FIG. 7A are suited for the uplink power saving mode operation.

The processing circuit 416 is configured to detect the uplink inactivity periods 700-1 and 700-2 by continuously measuring an uplink energy level of the set of uplink radio resources (block 708). The processing circuit 416 then checks the measured uplink energy level against the first threshold $TH_1$ (block 710). If the measured uplink energy level is above the first threshold $TH_1$, the processing circuit 416 will continue measuring the uplink energy level of the set of uplink radio resources (block 708). If the measured uplink energy level is below the first threshold $TH_1$, the processing circuit 416 can then conclude that one or more of the uplink inactivity periods 700-1 and 700-2 has been detected (block 712).

The processing circuit 416 will then check whether any of the detected uplink inactivity periods 700-1 and 700-2 lasts for a duration longer than the second threshold $TH_2$ (block 714). If none of the detected uplink inactivity periods 700-1 and 700-2 lasts for the duration longer than a second threshold $TH_2$, the processing circuit 416 will cause the remote unit 400 to operate in the active mode operation (block 716) and continuously measure the uplink energy level of the set of uplink radio resources (block 708). If any of the detected uplink inactivity periods 700-1 and 700-2 lasts for the duration longer than the second threshold $TH_2$, the processing circuit 416 will further determine whether the detected uplink inactivity period is repeated for the defined number of times ($TH_3$) over a defined uplink repetition period (block 718). In a non-limiting example, the defined uplink repetition period can be so determined to span across multiple RACH intervals 704. If none of the detected downlink inactivity periods are repeated for the defined number of times ($TH_3$) over the defined uplink repetition period, the processing circuit 416 will cause the remote unit 400 to operate in the active mode operation (block 716) and continuously measure the uplink energy level of the set of uplink radio resources (block 708). Otherwise, the processing circuit 416 can conclude that at least one of the detected uplink inactivity periods 700-1 and 700-2 is suited for the uplink power saving mode operation and will therefore cause the remote unit 400 to enter the uplink power saving mode operation (block 720). Notably, the processing circuit 416 will continuously measure the uplink energy level of the set of uplink radio resources (block 604) during the uplink power saving mode operation. In addition, the processing circuit 416 should also continuously monitor the RACH during the uplink power saving mode operation. Should the measured uplink energy level become higher than the first threshold $TH_1$ during any of the uplink inactivity periods 700-1 and 700-2 based on whether the uplink power saving mode operation is performed, or should any activity be detected on the RACH, the processing circuit 416 may abort the uplink power saving mode operation and repeat the evaluation process 706 to detect a next uplink power saving opportunity.

Through the evaluation process 706, the processing circuit 416 may determine that both the detected uplink inactivity periods 700-1 and 700-2 are suited for the uplink power saving operation. In this regard, in one embodiment, the processing circuit 416 may rank the detected uplink inactivity periods 700-1 and 700-2 based on a set of predetermined ranking criteria. Accordingly, the processing circuit 416 can cause the remote unit 400 to operate in the uplink power saving mode operation based on a highest ranked uplink inactivity period among the detected uplink inactivity periods 700-1 and 700-2. Should the processing circuit 416 abort the uplink power saving mode operation for any cause, the processing circuit 416 may redetermine and/or re-rank any of the detected uplink inactivity periods 700-1 and 700-2 in accordance with the evaluation process 708.

With reference back to FIG. 4, in the downlink power saving mode operation, the processing circuit 416 may deactivate the PA 408 and/or any other active/passive circuits involved in transmitting the downlink communications signal 404D. In the uplink power saving mode operation, the processing circuit 416 may deactivate the LNA 410 and/or any other active/passive circuits involved in receiving the uplink communications signal 404U. The processing circuit 416 may determine an exit time of each of the power saving intervals 422(1)-422(M) to ensure that the remote unit 400 can exit the power saving mode operation prior to an end of each of the power saving intervals 422(1)-422(M). The exit time may be so determined to account for ramp-up time of the active/passive circuits that are deactivated during the power saving mode operation.

The remote unit 400 may include a memory circuit 424, which can be a random-access memory (RAM) circuit, a read-only memory (ROM) circuit, or a flash memory circuit, as an example. The memory circuit 424 may be configured to store such parameters (e.g., the SSB burst interval 226, the RACH interval 704, and location of the RACH) that the processing circuit 416 can rely on to perform the evaluation processes 602 and 708.

The remote unit 400 may further include an interface circuit 426 configured to couple the remote unit 400 to a routing unit (RU) 428 over an optical fiber-based communications medium 430. In a non-limiting example, the RU 428 is functionally equivalent to the DRU 322 in FIG. 3. In this regard, the RU 428 can include the E/O converter 340 and the O/E converter 342 and the interface circuit 426 can include the E/O converter 344 and the O/E converter 346, as illustrated in FIG. 3.

Figure 8:
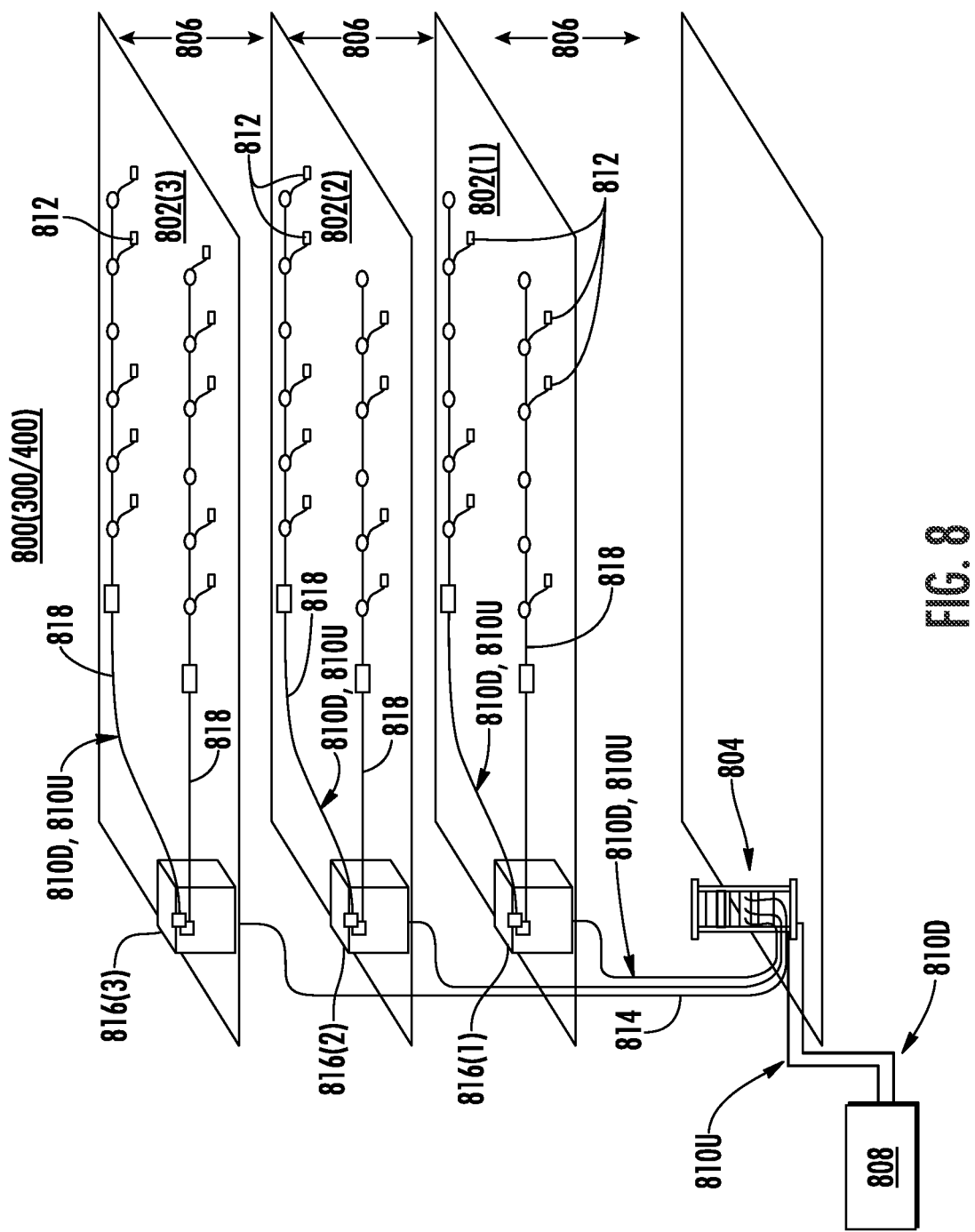
FIG. 8 is a partial schematic cut-away diagram of an exemplary building infrastructure in a WCS, such as the WCS of FIG. 3 that includes the remote unit of FIG. 4 for supporting autonomous power saving.

The WCS 300 of FIG. 3, which can include the remote unit 400 in FIG. 4, can be provided in an indoor environment as illustrated in FIG. 8. FIG. 8 is a partial schematic cut-away diagram of an exemplary building infrastructure 800 in a WCS, such as the WCS 300 of FIG. 3 that includes the remote unit 400 of FIG. 4 for supporting autonomous power saving. The building infrastructure 800 in this embodiment includes a first (ground) floor 802(1), a second floor 802(2), and a third floor 802(3). The floors 802(1)-802(3) are serviced by a central unit 804 to provide antenna coverage areas 806 in the building infrastructure 800. The central unit 804 is communicatively coupled to a base station 808 to receive downlink communications signals 810D from the base station 808. The central unit 804 is communicatively coupled to a plurality of remote units 812 to distribute the downlink communications signals 810D to the remote units 812 and to receive uplink communications signals 810U from the remote units 812, as previously discussed above. The downlink communications signals 810D and the uplink communications signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the remote units 812 and also provide power to the remote units 812 via array cables 818.

Figure 9:
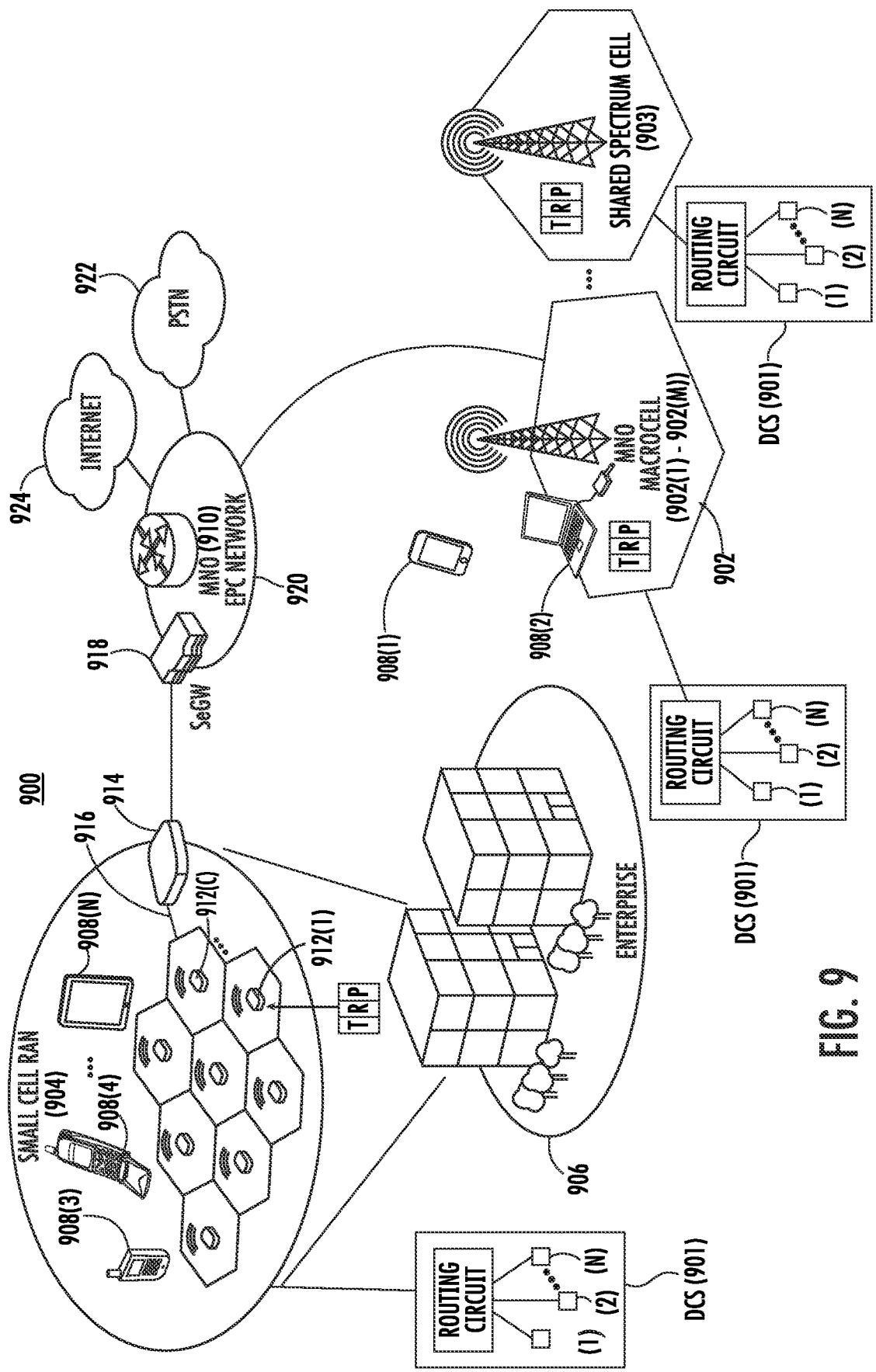
FIG. 9 is a schematic diagram of an exemplary mobile telecommunications environment that can includes the WCS of FIG. 3 that includes the remote unit of FIG. 4 for supporting autonomous power saving.

The WCS 300 of FIG. 3 and the remote unit 400 of FIG. 4, configured to support autonomous power saving, can also be interfaced with different types of radio nodes of service providers and/or supporting service providers, including macrocell systems, small cell systems, and remote radio heads (RRH) systems, as examples. For example, FIG. 9 is a schematic diagram of an exemplary mobile telecommunications environment 900 (also referred to as "environment 900") that includes radio nodes and cells that may support shared spectrum, such as unlicensed spectrum, and can be interfaced to shared spectrum WCSs 901 supporting coordination of distribution of shared spectrum from multiple service providers to remote units to be distributed to subscriber devices. The shared spectrum WCSs 901 can include the WCS 300 of FIG. 3 that includes the remote unit 400 of FIG. 4, as an example.

The environment 900 includes exemplary macrocell RANs 902(1)-902(M) ("macrocells 902(1)-902(M)") and an exemplary small cell RAN 904 located within an enterprise environment 906 and configured to service mobile communications between a user mobile communications device 908(1)-908(N) to a mobile network operator (MNO) 910. A serving RAN for the user mobile communications devices 908(1)-908(N) is a RAN or cell in the RAN in which the user mobile communications devices 908(1)-908(N) have an established communications session with the exchange of mobile communications signals for mobile communications. Thus, a serving RAN may also be referred to herein as a serving cell. For example, the user mobile communications devices 908(3)-908(N) in FIG. 9 are being serviced by the small cell RAN 904, whereas the user mobile communications devices 908(1) and 908(2) are being serviced by the macrocell 902. The macrocell 902 is an MNO macrocell in this example. However, a shared spectrum RAN 903 (also referred to as "shared spectrum cell 903") includes a macrocell in this example and supports communications on frequencies that are not solely licensed to a particular MNO, such as CBRS for example, and thus may service user mobile communications devices 908(1)-908(N) independent of a particular MNO. For example, the shared spectrum cell 903 may be operated by a third party that is not an MNO and wherein the shared spectrum cell 903 supports CBRS. Also, as shown in FIG. 9, the MNO macrocell 902, the shared spectrum cell 903, and/or the small cell RAN 904 can interface with a shared spectrum WCS 901 supporting coordination of distribution of shared spectrum from multiple service providers to remote units to be distributed to subscriber devices. The MNO macrocell 902, the shared spectrum cell 903, and the small cell RAN 904 may be neighboring radio access systems to each other, meaning that some or all can be in proximity to each other such that a user mobile communications device 908(3)-908(N) may be able to be in communications range of two or more of the MNO macrocell 902, the shared spectrum cell 903, and the small cell RAN 904 depending on the location of the user mobile communications devices 908(3)-908(N).

In FIG. 9, the mobile telecommunications environment 900 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 900 includes the enterprise environment 906 in which the small cell RAN 904 is implemented. The small cell RAN 904 includes a plurality of small cell radio nodes 912(1)-912(C). Each small cell radio node 912(1)-912(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 9, the small cell RAN 904 includes one or more services nodes (represented as a single services node 914) that manage and control the small cell radio nodes 912(1)-912(C). In alternative implementations, the management and control functionality may be incorporated into a radio node, distributed among nodes, or implemented remotely (i.e., using infrastructure external to the small cell RAN 904). The small cell radio nodes 912(1)-912(C) are coupled to the services node 914 over a direct or local area network (LAN) connection 916 as an example, typically using secure IPsec tunnels. The small cell radio nodes 912(1)-912(C) can include multi-operator radio nodes. The services node 914 aggregates voice and data traffic from the small cell radio nodes 912(1)-912(C) and provides connectivity over an IPsec tunnel to a security gateway (SeGW) 918 in a network 920 (e.g., evolved packet core (EPC) network in a 4G network, or 5G Core in a 5G network) of the MNO 910. The network 920 is typically configured to communicate with a public switched telephone network (PSTN) 922 to carry circuit-switched traffic, as well as for communicating with an external packet-switched network such as the Internet 924.

The environment 900 also generally includes a node (e.g., eNodeB or gNodeB) base station, or "macrocell" 902. The radio coverage area of the macrocell 902 is typically much larger than that of a small cell where the extent of coverage often depends on the base station configuration and surrounding geography. Thus, a given user mobile communications device 908(3)-908(N) may achieve connectivity to the network 920 (e.g., EPC network in a 4G network, or 5G Core in a 5G network) through either a macrocell 902 or small cell radio node 912(1)-912(C) in the small cell RAN 904 in the environment 900.

Figure 10:
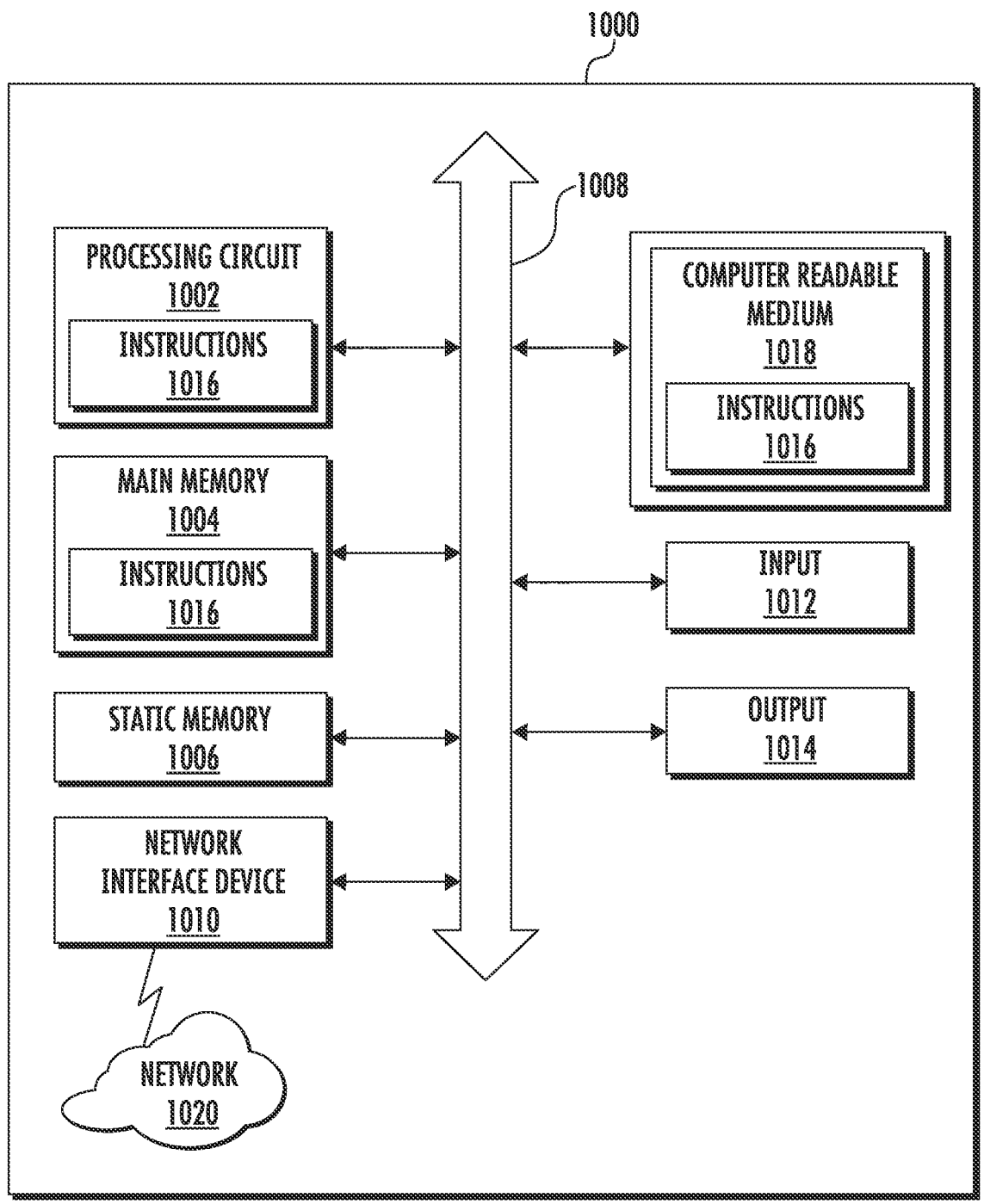
FIG. 10 is a schematic diagram of a representation of an exemplary computer system that can be included in or interfaced with any of the components in the WCS of FIG. 3 and the remote unit in FIG. 4 for supporting autonomous power saving, wherein the exemplary computer system is configured to execute instructions from an exemplary computer-readable medium.

Any of the circuits in the WCS 300 of FIG. 3 and the remote unit 400 of FIG. 4, such as the processing circuit 416, can include a computer system 1000, such as that shown in FIG. 10, to carry out their functions and operations. With reference to FIG. 10, the computer system 1000 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or static memory 1006 directly or via some other connectivity means. The processing circuit 1002 may be a controller, and the main memory 1004 or static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting the computer-readable medium 1018. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:
1. A remote unit, comprising:
a radio frequency (RF) front-end circuit configured to communicate at least one downlink communications signal and receive at least one uplink communications signal over a set of radio resources, wherein the set of radio resources comprises a set of downlink radio resources configured to carry the at least one downlink communications signal; and
a processing circuit configured to:
determine at least one inactivity period in the set of radio resources that is suited for a power saving mode operation, wherein the at least one inactivity period comprises at least one downlink inactivity period in the set of downlink radio resources, and wherein the power saving mode operation comprises a downlink power saving mode operation;
define a plurality of power saving intervals based on the determined at least one inactivity period; and
cause the remote unit to operate in the power saving mode operation in each of the plurality of power saving intervals;
wherein the processing circuit is further configured to:
measure a downlink energy level in the set of downlink radio resources to detect the at least one downlink inactivity period wherein the measured downlink energy level is below a first threshold for a duration longer than a second threshold;

determine that the at least one downlink inactivity period is suited for the downlink power saving mode operation in response to the at least one downlink inactivity period being repeated for a defined number of times over a defined downlink repetition period;

define a plurality of downlink power saving intervals based on the at least one downlink inactivity period; and cause the remote unit to operate in the downlink power saving mode operation in each of the plurality of downlink power saving intervals.

2. The remote unit of claim 1, wherein the processing circuit is further configured to cause the remote unit to operate in an active mode operation in response to not detecting the at least one inactivity period that is suited for the power saving mode operation.

3. The remote unit of claim 1, wherein the processing circuit is further configured to determine an exit time in each of the plurality of power saving intervals to thereby cause the remote unit to exit the power saving mode operation by an end of each of the plurality of power saving intervals.

4. The remote unit of claim 1, wherein the defined downlink repetition period comprises a plurality of synchronization signal block (SSB) burst intervals.

5. The remote unit of claim 1, wherein the processing circuit is further configured to:

measure the downlink energy level in the set of downlink radio resources during each of the plurality of downlink power saving intervals; and cause the remote unit to abort the downlink power saving mode operation in response to the measured downlink energy level being above the first threshold.

6. The remote unit of claim 1, wherein the processing circuit is further configured to redetermine the at least one downlink inactivity period that is suited for the downlink power saving mode operation upon causing the remote unit to abort the downlink power saving mode operation.

7. The remote unit of claim 1, wherein:

the set of radio resources further comprises a set of uplink radio resources configured to carry the at least one uplink communications signal;

the at least one inactivity period further comprises at least one uplink inactivity period in the set of uplink radio resources; and the power saving mode operation further comprises an uplink power saving mode operation.

8. The remote unit of claim 7, wherein the processing circuit is further configured to:

measure an uplink energy level in the set of uplink radio resources to detect the at least one uplink inactivity period wherein the measured uplink energy level is below the first threshold for the duration longer than the second threshold;

determine that the at least one uplink inactivity period is suited for the uplink power saving mode operation in response to the at least one uplink inactivity period being repeated for the defined number of times over a defined uplink repetition period;

define a plurality of uplink power saving intervals based on the at least one uplink inactivity period; and cause the remote unit to operate in the uplink power saving mode operation in each of the plurality of uplink power saving intervals.

9. The remote unit of claim 8, wherein the processing circuit is further configured to:

measure the uplink energy level in the set of uplink radio resources during each of the plurality of uplink power saving intervals; and cause the remote unit to abort the uplink power saving mode operation in response to the measured uplink energy level being above the first threshold.

10. The remote unit of claim 9, wherein the processing circuit is further configured to redetermine the at least one uplink inactivity period that is suited for the uplink power saving mode operation upon causing the remote unit to abort the uplink power saving mode operation.

11. The remote unit of claim 8, wherein the processing circuit is further configured to:

monitor a random-access channel (RACH) during each of the plurality of uplink power saving intervals; and cause the remote unit to abort the uplink power saving mode operation in response to detecting any activity on the RACH.

12. A method for supporting autonomous power saving, comprising:

determining at least one inactivity period in a set of radio resources that is suited for a power saving mode operation;

defining a plurality of power saving intervals based on the determined at least one inactivity period; and operating in the power saving mode operation in each of the plurality of power saving intervals;

wherein the method further comprises:

measuring a downlink energy level in a set of downlink radio resources to detect at least one downlink inactivity period wherein the measured downlink energy level is below a first threshold for a duration longer than a second threshold;

determining that the at least one downlink inactivity period is suited for a downlink power saving mode operation in response to the at least one downlink inactivity period being repeated for a defined number of times over a defined downlink repetition period;

defining a plurality of downlink power saving intervals based on the at least one downlink inactivity period; and operating in the downlink power saving mode operation in each of the plurality of downlink power saving intervals.

13. The method of claim 12, further comprising operating in an active mode operation in response to not detecting the at least one inactivity period that is suited for the power saving mode operation.

14. The method of claim 12, further comprising determining an exit time in each of the plurality of power saving intervals to thereby exit the power saving mode operation by an end of each of the plurality of power saving intervals.

15. The method of claim 14, further comprising:

measuring the downlink energy level in the set of downlink radio resources during each of the plurality of downlink power saving intervals; and aborting the downlink power saving mode operation in response to the measured downlink energy level being above the first threshold.

16. The method of claim 15, further comprising redetermining the at least one downlink inactivity period that is suited for the downlink power saving mode operation upon aborting the downlink power saving mode operation.

17. The method of claim 12, further comprising:

measuring an uplink energy level in a set of uplink radio resources to detect at least one uplink inactivity period wherein the measured uplink energy level is below the first threshold for the duration longer than the second threshold;

determining that the at least one uplink inactivity period is suited for an uplink power saving mode operation in response to the at least one uplink inactivity period being repeated for the defined number of times over a defined uplink repetition period;

defining a plurality of uplink power saving intervals based on the at least one uplink inactivity period; and operating in the uplink power saving mode operation in each of the plurality of uplink power saving intervals.

18. The method of claim 17, further comprising:

measuring the uplink energy level in the set of uplink radio resources during each of the plurality of uplink power saving intervals; and aborting the uplink power saving mode operation in response to the measured uplink energy level being above the first threshold.

19. The method of claim 18, further comprising redetermining the at least one uplink inactivity period that is suited for the uplink power saving mode operation upon aborting the uplink power saving mode operation.

20. The method of claim 17, further comprising:

monitoring a random-access channel (RACH) during each of the plurality of uplink power saving intervals; and aborting the uplink power saving mode operation in response to detecting any activity on the RACH.

\* \* \* \* \*